United States Patent [19]
Discenzo

[11] Patent Number: 5,995,910
[45] Date of Patent: Nov. 30, 1999

[54] METHOD AND SYSTEM FOR SYNTHESIZING VIBRATION DATA

[75] Inventor: Frederick M. Discenzo, Brecksville, Ohio

[73] Assignee: Reliance Electric Industrial Company, Cleveland, Ohio

[21] Appl. No.: 08/921,409

[22] Filed: Aug. 29, 1997

[51] Int. Cl.[6] ............................. G01H 11/00; G06F 19/00
[52] U.S. Cl. .................................. 702/56; 702/54; 702/34
[58] Field of Search ................................ 702/34, 56, 141, 702/127; 73/577, 660, 659, 650

[56] References Cited

U.S. PATENT DOCUMENTS

| | | | |
|---|---|---|---|
| 4,184,205 | 1/1980 | Morrow | 702/34 |
| 4,965,513 | 10/1990 | Haynes et al. | 73/659 |
| 4,980,844 | 12/1990 | Demjanenko et al. | 702/56 |
| 5,003,490 | 3/1991 | Castelaz et al. | 706/22 |
| 5,049,815 | 9/1991 | Kliman . | |
| 5,309,379 | 5/1994 | Rawlings et al. | 702/127 |
| 5,313,407 | 5/1994 | Tiernan et al. . | |
| 5,333,240 | 7/1994 | Matsumoto et al. . | |
| 5,367,612 | 11/1994 | Bozich et al. . | |
| 5,413,116 | 5/1995 | Radke et al. . | |
| 5,419,197 | 5/1995 | Ogi et al. | 702/141 |
| 5,461,329 | 10/1995 | Linehan et al. . | |
| 5,530,343 | 6/1996 | Bowers, III et al. . | |
| 5,533,519 | 7/1996 | Radke et al. . | |
| 5,571,969 | 11/1996 | Kawasaki . | |
| 5,574,387 | 11/1996 | Petsche et al. . | |
| 5,576,632 | 11/1996 | Petsche et al. | 324/772 |
| 5,579,232 | 11/1996 | Tong et al. | 702/34 |
| 5,629,870 | 5/1997 | Farag et al. . | |
| 5,640,103 | 6/1997 | Petsche et al. . | |

OTHER PUBLICATIONS

Mallat, "A Theory for Multiresolution Signal Decomposition: The Wavelet Representation," IEEE transaction on Pattern Analysis and Machine Intelligence 11(7):674–693, Jul. 1989.

DeVore, Jawerth, and Lucier, "Image Compression Through Wavelet Transform Coding," IEEE Transactions on Information Theory 38(2):719–746, Mar. 1992.

Beylkin, Coifman and Rokhlin, "Fast Wavelet Transforms and Numerical Algorithm I," Communications on Pure and Applied Mathematics 44:141–183, 1991.

*Primary Examiner*—Marc S. Hoff
*Assistant Examiner*—Bryan Bui
*Attorney, Agent, or Firm*—John M. Miller; John J. Horn; Himanshu S. Amin

[57] ABSTRACT

A system for training a neural network to synthesize vibration data relating to the operation of a machine. The system includes a first sensor operatively coupleable to the machine, the first sensor adapted to obtain at least one vibration signal relating to the operation of the machine. The system further includes a second sensor operatively coupleable to a power lead of the machine, the second sensor adapted to obtain at least one current signal relating to the operation of a machine. Additionally, the system includes a neural network operatively coupleable to the second sensor, the neural network being trainable to generate at least one synthesized vibration signal from the current signal, wherein the synthesized vibration signal is substantially equivalent to the vibration signal obtained from the first sensor.

33 Claims, 13 Drawing Sheets

| | $f_0$ | $f_1$ | $f_2$ | $f_3$ | $f_4$ | • | • | • | $f_n$ | |
|---|---|---|---|---|---|---|---|---|---|---|
| | $A_3$ | $A_{34}$ | $A_{67}$ | $A_{78}$ | $A_{84}$ | • | • | • | $A_K$ | HEALTHY MOTOR |
| | $A_{34}$ | $A_{-68}$ | $A_{-90}$ | $A_{-65}$ | $A_{45}$ | • | • | • | $A_H$ | HEALTHY MOTOR |
| | $A_{56}$ | $A_{45}$ | $A_{45}$ | $A_{56}$ | $A_{78}$ | • | • | • | $A_X$ | BAD BEARING |
| | $A_{-23}$ | $A_{45}$ | $A_7$ | $A_{90}$ | $A_{12}$ | • | • | • | $A_Z$ | CRACKED ROTOR |
| | $A_{67}$ | $A_{36}$ | $A_3$ | $A_{45}$ | $A_{47}$ | • | • | • | $A_X$ | INSULATION PROBLEM |
| | $A_{78}$ | $A_{67}$ | $A_{12}$ | $A_{67}$ | $A_{37}$ | • | • | • | $A_C$ | HEALTHY MOTOR |
| | $A_{234}$ | $A_{27}$ | $A_{478}$ | $A_{24}$ | $A_{127}$ | • | • | • | $A_Q$ | BAD BEARING |
| | $A_{-98}$ | $A_{78}$ | $A_{26}$ | $A_{12}$ | $A_{128}$ | • | • | • | $A_B$ | CRACKED CASING |
| | $A_{26}$ | $A_{96}$ | $A_{83}$ | $A_{56}$ | $A_{234}$ | • | • | • | $A_M$ | LUBRICATION PROBLEM |
| | $A_4$ | $A_{32}$ | $A_{187}$ | $A_{56}$ | $A_{34}$ | • | • | • | $A_I$ | BAD INNER RACE |
| | $A_0$ | $A_{16}$ | $A_{73}$ | $A_{76}$ | $A_{33}$ | • | • | • | $A_E$ | BAD OUTER RACE |
| | $A_{75}$ | $A_{17}$ | $A_{45}$ | $A_{69}$ | $A_{44}$ | • | • | • | $A_Q$ | BAD BALL SURFACE |

Fig. 10

METHOD AND SYSTEM FOR SYNTHESIZING VIBRATION DATA

TECHNICAL FIELD

The present invention generally relates to a system and method for obtaining and using synthesized vibration data for machinery diagnosis and failure prediction. In particular, the present invention employs a neural network to synthesize vibration data encoded in instantaneous current data in order to diagnose the state of electric machines such as motors, pumps, generators, systems and gear boxes.

BACKGROUND OF THE INVENTION

Electric machines such as motors and generators are widely employed in industrial and commercial facilities. These machines are relied upon to operate with minimal attention and provide for long, reliable operation. Many facilities operate several hundreds or even thousands of such machines concurrently, many of which are integrated into a large interdependent process or system. Like most machinery, at least a small percentage of such induction motors are prone to failure. The majority of such failures can be attributed to either mechanical failures and/or thermal failures of the motor insulation.

Other than normal aging, failures are typically due to: poor or no maintenance; improper application (e.g., wrong enclosure, excessive loading, etc.); and improper installation (e.g., misalignment, bad power, inverter mismatch, etc.). Even with normal aging failures, it is desirable to provide low cost failure prediction information for such machines.

Depending on the application, the failure of a machine in service can possibly lead to system or process down time, inconvenience, and possibly, even a hazardous situation. Thus, it desirable to diagnose the machinery for possible failure or faults early in order to avoid such problems. Absent special monitoring for certain motor problems, the problems may have an insidious effect in that although only a minor problem on the onset the problem could become serious if not detected. For example, insulation problems and electrical problems may not become apparent until irreversible damage has resulted. Likewise, bearing problems due to inadequate lubrication, contamination or other causes may not become apparent until irreversible damage has occurred.

Vibration analysis is the established technique for determining the health of mechanical components in rotating machinery such as induction motors. To obtain vibration data for machinery analysis, accelerometers as well as associated sampling and filtering techniques are often employed. Larger machines and/or systems may employ proximity detectors to determine vibration.

In using accelerometers, the accelerometers are mounted on the machine being monitored, which also requires access to the machine to mount the sensors during testing. The location and orientation of the accelerometers are critical to the characteristics of the signal obtained. A vibration generated in one part of the machine is transmitted through the solids separating the source from the accelerometer. The analysis of the vibration signals taken at various times is dependent on the ability to reproduce the precise location and direction of mounting of the accelerometers. Thus, in most cases, accelerometers and/or their mounting fixtures are permanently installed on the equipment to be monitored.

Since accelerometers sense vibration primarily in one direction, multiple sensors are typically necessary to detect the vibrations generated in other directions and in different parts of some equipment. Thus, in order to sense all significant vibration directions, it may be necessary to install multiple-axis sensors. The results obtained are then combined and analyzed to develop the diagnostic information. To obtain good vibration data in order to perform the analysis it is desired to cover 5 axes with accelerometers (e.g., a 3-axis accelerometer at the load-end of the machine and a 2-axis accelerometer at the other end). However, these accelerometers are generally very expensive, the cost of which may exceed the price of the machine being analyzed.

There are alternative techniques (e.g., current signature analysis) other than vibration analysis for analyzing a machine. However, mechanical problems of a machine usually are manifested most prominently via vibrations. Thus vibration analysis is still the desired method for analyzing a machine for mechanically related problems. Furthermore, since so much of machine analysis and diagnosis has been done through vibration analysis, there is an extensive amount of historical vibration signature data available for use in determining the health of a machine.

Consequently, there is a strong need in the art for a method and/or system for analyzing a machine for mechanical problems using classical vibration analysis technique without having to employ expensive vibration sensors to carry out the analysis.

SUMMARY OF THE INVENTION

The present invention provides for a method and system for synthesizing vibration data. It has been found that vibration data relating to the state of a machine is encoded in the instantaneous current of the machine. The present invention provides a method and system for extracting (i.e., synthesizing) the vibration data directly from the instantaneous current. As a result, the present invention provides for a method and system to analyze the state of a machine using classical vibration analysis techniques without having to employ vibration sensors to carry out the analysis.

More particularly, in a preferred embodiment the present invention includes training a neural network to correlate an actual vibration signature (i.e. taken from a sensor) with a corresponding current signature. The present invention will be described with respect to an AC induction motor, however, it is to be appreciated that the present invention has applicability to substantially any type of electric machine where vibration signature analysis can be performed to determine the state (e.g., health) of the machine and vibration data is encoded in another signal, such as motor current or air gap flux. In addition, the present invention may be utilized to synthesize a gear box vibration signal from an acoustic sensor or sensor array. Furthermore, the present invention may be employed to provide failure detection/prediction for connected, downstream equipment such as pumps. It will be appreciated that the present invention can be extended to synthesize another signal (other than vibration) from another signal (ie., sampled signal) more readily obtained, provided that the signal to be synthesized is substantially encoded in the sampled signal.

The training process is performed until virtually all relevant vibration signatures are correlated with related motor current signatures. Once the training is completed, the actual vibration signature is no longer needed—the trained neural network is able to generate a synthesized vibration signature directly from the motor current signatures. The synthesized vibration signature is then used to carry out classical vibration analysis on the machine.

The trained neural network can be easily incorporated into the type of machine it has been trained to generate synthesized vibration signatures for. As a result of the trained neural network being able to synthesize vibration signature information directly from the machine's instantaneous current, the need for expensive vibration sensors (e.g., accelerometers) physically mounted to the machine is avoided. Furthermore, the instantaneous motor current data can be obtained from a motor control center (MCC) located remote from the motor in an easy to access and less noisy environment than the area where the motor is located. The analysis and the gathering of the data for the analysis can thus be conducted at a more convenient location as compared to the locations (i.e., at the motor itself) where traditional methods for vibration data acquisition are performed.

The present invention provides for a system and method which is cost effective, reliable and easy to carry out classical vibration analysis.

In accordance with one particular aspect of the present invention, a system for training a neural network to synthesize vibration data relating to the operation of a machine is provided, including: a first sensor operatively coupleable to the machine, the first sensor adapted to obtain at least one vibration signal relating to the operation of the machine; a second sensor operatively coupleable to a power lead of the machine, the second sensor adapted to obtain at least one current signal relating to the operation of a machine; and a neural network operatively coupleable to the second sensor, the neural network being trainable to generate at least one synthesized vibration signal from the current signal, wherein the synthesized vibration signal is substantially equivalent to the vibration signal obtained from the first sensor.

Another aspect of the present invention provides for a method for synthesizing vibration data, including the steps of: collecting at least one sample of vibration data signal relating to the operation of a machine; collecting at least one sample of current data signal relating to the operation of the machine; inputting the at least one sample of current data signal to a neural network; and using the neural network to synthesize at least one vibration data signal from the at least one sampled current data, the at least one synthesized vibration signal being substantially equivalent to the at least one sample of vibration data signal.

According to another aspect of the present invention, a system for diagnosing a machine using synthesized vibration data is provided, including: a sensor for obtaining current data relating to the operation of a machine; a neural network operatively coupleable to the sensor, the neural network adapted to synthesize a vibration signal from the sampled current data, and a processor operatively coupleable to the neural network, the processor adapted to receive the synthesized vibration signal and employ the synthesized vibration signal to facilitate diagnosing the state of the machine.

Still yet another aspect of the present invention provides for a method for diagnosing a machine, including the steps of: collecting at least one sample of current data relating to the operation of the machine; inputting the at least one sample of current data to a neural network; using the neural network to synthesize a vibration data signal from the at least one sample of current data; determining the diagnostic state of the machine from the synthesized vibration data signal.

A further aspect of the present invention provides for a system for diagnosing a plurality of machines using synthesized vibration data, including: a plurality of sensors for obtaining current data relating to the operation of the plurality of machines; a channel interface operatively coupleable to the plurality of sensors, the channel interface designating a separate channel for each of the plurality of sensors; a host computer operatively coupleable to the channel interface, the host computer including a neural network operatively coupleable to each channel of the channel interface, the neural network adapted to synthesize vibration signals corresponding to each of the plurality of machines from the sampled current data; wherein a processor of the host computer cycles through each of the channels, the processor performing classical vibration analysis on each of the plurality of machines using the synthesized vibration signal for each respective machine.

In accordance with yet another aspect of the present invention, a system for training a neural network to synthesize data relating to the operation of a machine is provided, including: a first sensor operatively coupleable to the machine, the first sensor adapted to obtain a first signal relating to the operation of the machine; a second sensor operatively coupleable to the machine, the second sensor adapted to obtain a second signal relating to the operation of a machine, the second signal having data relating to the first signal encoded therein; and a neural network operatively coupleable to the second sensor, the neural network being trainable to generate a synthesized first signal from the second signal, wherein the synthesized first signal is substantially equivalent to the first signal obtained from the first sensor.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 5b is a graph of a Fast Fourier Transform signal representative of the instantaneous motor current signal of FIG. 5a;

FIG. 6b is a graph of a Fast Fourier Transform signal representative of the instantaneous motor current signal of FIG. 6a;

FIG. 10 is a table diagram of vibration amplitudes over a range of frequencies, which may be used to facilitate diagnosing the state of a machine in accordance with the present invention;

DESCRIPTION OF THE PREFERRED EMBODIMENTS

Figure 1:
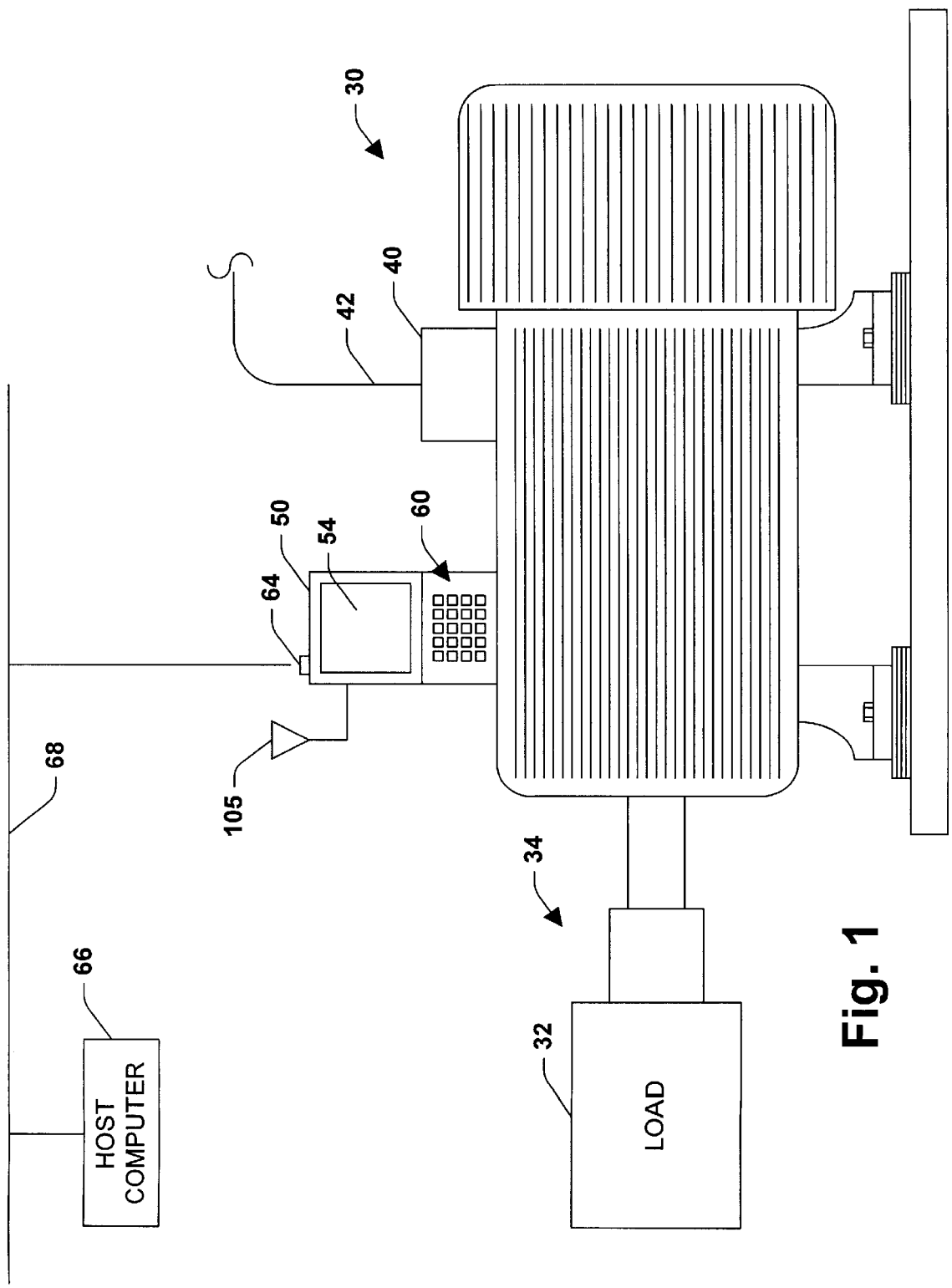
FIG. 1 is a side view of an integrated AC induction motor and diagnostic apparatus in accordance with one particular aspect of the present invention.

The present invention will now be described with reference to the drawings, wherein like reference numerals are used to refer to like elements throughout.

As is mentioned above, the present invention relates to a system and method for obtaining and using synthesized vibration data for machinery diagnosis and failure prediction. In particular, the present invention employs a neural network to synthesize vibration data encoded in instantaneous current data in order to diagnose a machine. As mentioned above, it is to be appreciated that the present invention can be applied to most electric machines (e.g., motors, pumps, generators, gear boxes, etc.) and/or systems where classical vibration analysis is performed for determining the state (i.e., health) of the machine or system.

Figure 2:
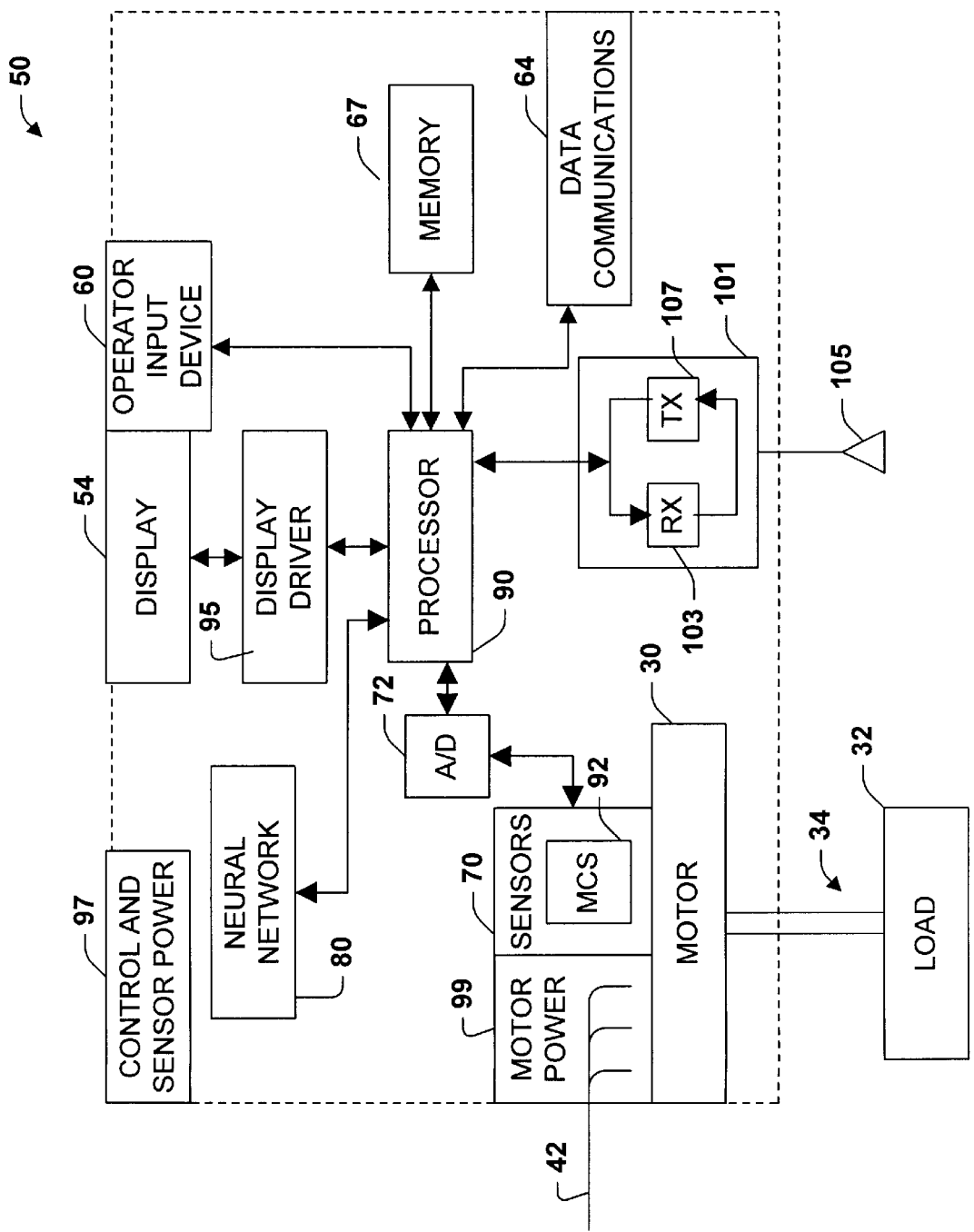
FIG. 2 is a functional schematic diagram of an integrated AC induction motor and diagnostic apparatus in accordance with the present invention.

Referring initially to FIGS. 1 and 2, one specific environment in which the present invention may be employed is shown. A three-phase AC induction motor 30 is depicted driving a load 32 through a shaft coupling 34. The motor 30 includes a junction box 40 for receiving conductors from power lines via a conduit 42, which are tied to power supply lines 99 (FIG. 2) of the motor 30. The motor 30 is AC powered and operates at an AC power line frequency of 60 Hz. However, it is appreciated that different line frequencies (e.g., 50 Hz) may be employed.

Coupled to the motor 30 is a diagnostic device 50. The diagnostic device 50 includes a display 54 for displaying to an operator information relating to the operation of the motor 30.

The diagnostic device 50 further includes an operator input device 60 in the form of a key pad which enables a user to enter data, information, function commands, etc. as is conventional. For example, the user may input information relating to motor status via the keypad 60 for subsequent transmission to a host computer 66. In addition, the keypad 60 may include up and down cursor keys for controlling a cursor which may be shown on the display 54. The diagnostic device 50 includes a communications port 64 for interfacing the diagnostic device 50 with the host computer 66 via a conventional communications link. According to a preferred aspect of the present invention, the diagnostic device 50 is part of a communication system including a network backbone 68. The network backbone 68 may be a hardwired data communication path made of twisted pair cable, shielded coaxial cable or fiber optic cable, for example, or may be wireless or partially wireless in nature. Information is transmitted via the network backbone 68 between the diagnostic device 50 and the host computer 66 which is coupled to the network backbone 68. The communication link preferably adheres to the RS232C or DeviceNet standard for communicating command and parameter information. However, any communication link suitable for carrying out the present invention may be employed.

Referring now specifically to FIG. 2, a schematic representation of the present invention is shown according to one particular aspect of the present invention, wherein the diagnostic device 50 is integrated with the three phase induction motor 30. However, it will be appreciated from the discussion herein that the diagnostic device 50 may be located remotely from the motor 30. Furthermore, it will be appreciated that the host computer 66 itself may be employed to carry out the herein described functions of the diagnostic device 50. The induction motor 30 includes the load 32 at the front end thereof. The output shaft 34 connects the load 32 to the motor 30. The load 32 may be any device or article typically driven by the motor 30 such as a pump.

A plurality of sensors 70 are coupled to various parts of the motor 70. The sensors 70 may include, for example, temperature sensors, motor voltage sensors, etc. as is conventional for monitoring the operation of the motor 30. The sensors 70 are tied to an analog to digital (A/D) converter 72, which converts the analog signals provided by the various sensors to digital form. The analog to digital converter 72 provides a neural network 80 and processor 90 with digitally converted signals corresponding to the analog signals provided by the sensors 70.

Figure 12:
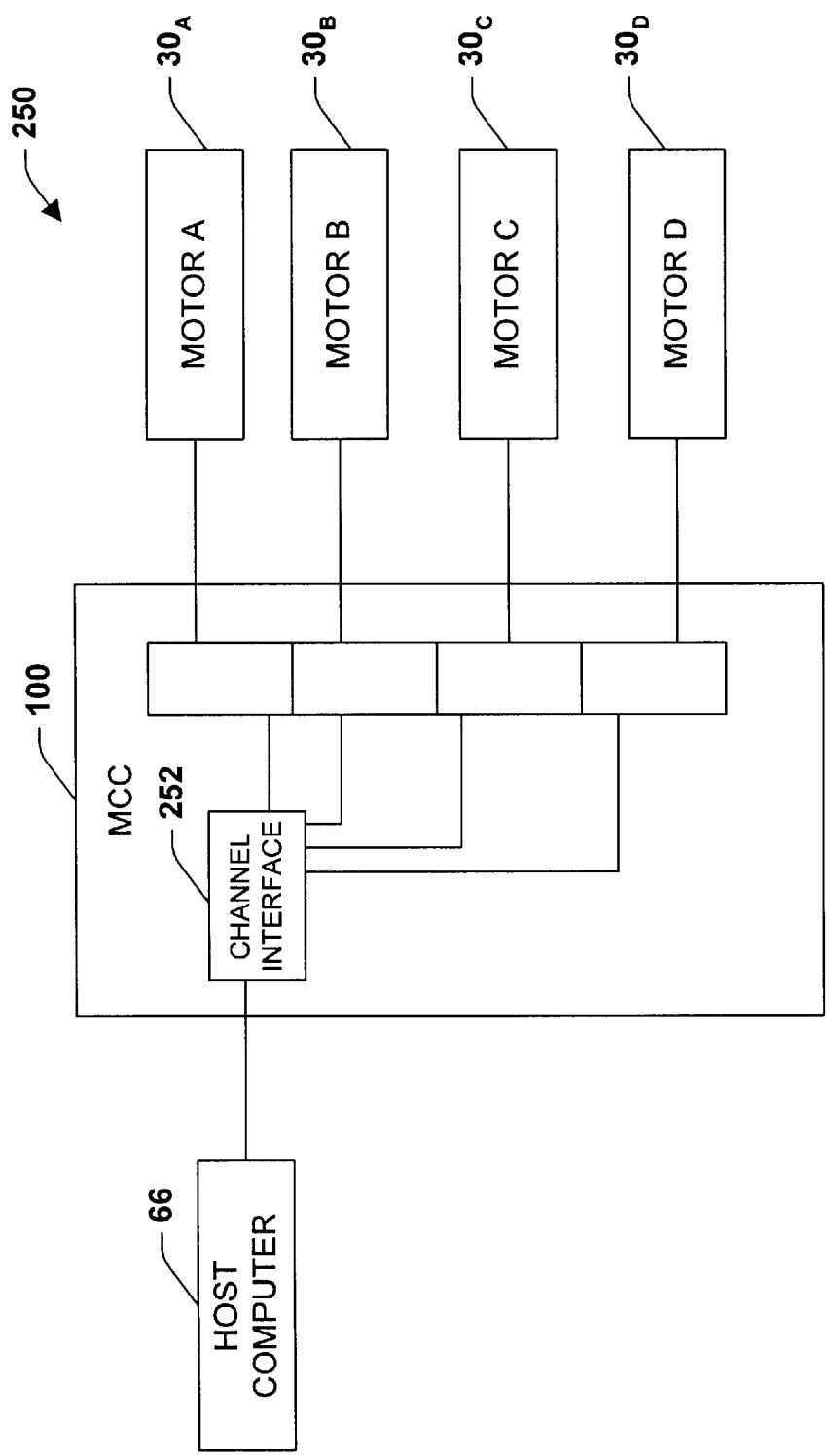
FIG. 12 is a schematic representation of a system for monitoring a plurality of machines in accordance with the present invention.

The sensors 70 include at least one motor current sensor 92 each of which are connected directly to the power lead wires 99 (shown as motor power) connecting the induction motor 30 to a source of power. Frequently the source of power is a motor control center 100 (FIG. 12). Motor control centers are often used with industrial-rated electric motors to start, control and protect the electric motor and associated electric circuitry. The motor control center typically contains motor starters to start and stop the motor along with circuit breakers to protect the electric motor and electric wiring. Preferably, the motor current sensors 92 are arranged as current transformers on each power line 99 to generate a signal corresponding to the current flowing through the respective power lead wire(s). Alternatively, it will be appreciated that motor current may be monitored by a separate split core current transformer clipped on a phase line at any point in the feed circuit for the motor 30. Such devices are similarly clamped about a single lead wire to the motor 30 without requiring removal of insulation or breaking wire. Installation direction or location does not affect either precision or accuracy. In other words, the motor current signal may be sensed anywhere along the wire(s) 99 running from the motor 30 back to the switch which directs the current from a common main to the wires carrying it to the motor 30. One preferred location is at the motor control center 100 (FIG. 12) since this is located typically in a milder environment (i.e., less harsh and less noisy environment) than the environment in which the motor 30 is located.

Figure 3:
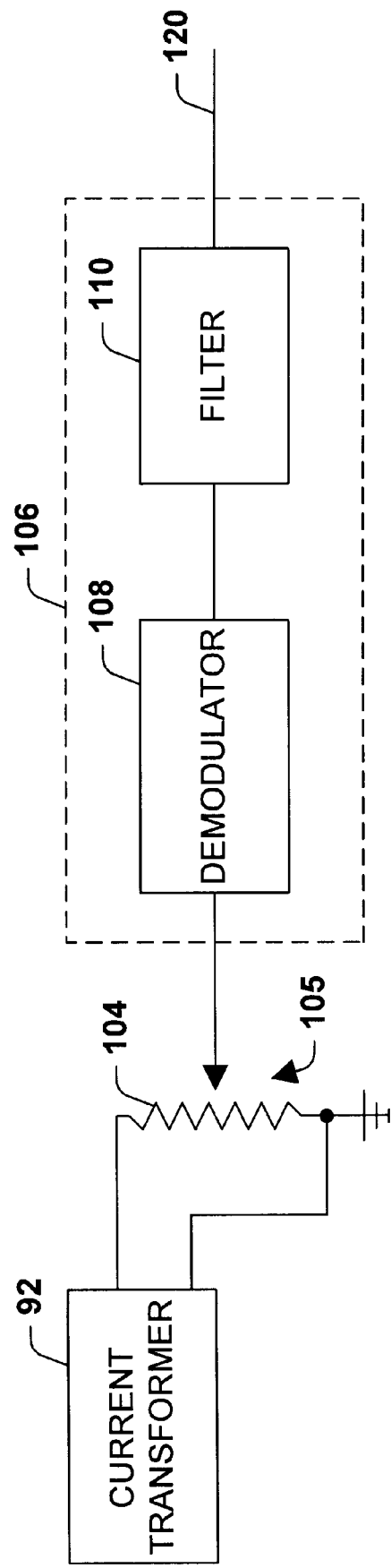
FIG. 3 is a block diagram of a current transformer and signal conditioning circuit in accordance with the present invention.

Turning briefly to FIG. 3, the output of the current transformer 92 (i.e., the output of the current transformer secondary) is a variable current signal proportional to the time-varying current flowing in the lead wire 99, and is applied across a load resistor 104 to generate a varying voltage across the resistor 104 which is proportional to the motor current. The resistor 104 may be in the form of a potentiometer having one end grounded. The variable contact 105 of the resistor 104 is connected to the input of a signal conditioning circuit 106. The resistor 104 is adjusted to provide a selected proportional relationship between the motor current and the corresponding AC voltage signal applied to the signal conditioning circuit 106. The signal conditioning circuit 106 includes a demodulator 108, in this case an RMS-to-DC converter, a device which produces a voltage proportional to the root-mean square (RMS) value (over a preset time interval), of the motor current signal. The demodulated signal is fed through a low pass filter 110 having an upper frequency cutoff below 60 Hz to remove spectra associated with the 60 Hz line frequency and its harmonics.

As will be discussed in greater detail below and illustrated in FIG. 4, the conditioned signal 120 is then fed to the neural network 80 in the herein described manner. The neural network 80 extracts vibration signature information from the conditioned signal 120 obtained from the raw motor current. The neural network 80 produces a synthesized vibration signature signal 136 which is analyzed by the processor 90 employing classical vibration analysis techniques. The synthesized vibration signature signal 136 is employed (utilizing already available historical published vibration analysis techniques) to diagnose the state of the motor 30. The synthesized vibration signature 136 is analyzed across a wide range of frequencies (e.g., fundamental, side band and harmonic ranges) to determine the state of the motor 30. However, it should be appreciated that the analysis can be narrowly performed over select frequencies of interest such as critical ball pass frequencies, outer race frequencies, etc., for example.

The motor vibration data includes the sum of all the mechanical load changes which refer back to the motor drive. Accordingly, the motor vibration information is an indicator of a variety of mechanical and electrical modulations associated with the state of the motor 30. For example, various motor defect situations such as bearing wear, bent shaft, cracks in the various parts of the motor, etc. all manifest themselves through vibrations of the motor 30. The vibration signal data is encoded in the motor current data. Thus, the motor current data includes information that may be extracted in the form of a synthesized vibration signature which can be used to diagnose the state of the motor 30 using classical vibration analysis techniques.

Returning back to FIG. 2, the processor 90 is responsible for controlling the general operation of the diagnostic apparatus 50. The processor 90 is programmed to control and operate the various components within the diagnostic apparatus 50 in order to carry out the various functions described herein. The processor or CPU 90 can be any of a plurality of processors, such as the p24T, Pentium 50/75, Pentium 60/90, and Pentium 66/100, Pentium PRO and Pentium 2, and other similar and compatible processors. The manner in which the processor 90 can be programmed to carry out the functions relating to the present invention will be readily apparent to those having ordinary skill in the art based on the description provided herein.

A memory 67 tied to the processor 90 is also included in the diagnostic apparatus 50 and serves to store program code executed by the processor 90 for carrying out operating functions of the diagnostic apparatus 50 as described herein. The memory 67 also serves as a storage medium for temporarily storing information such as historical vibration analysis data, tables (FIG. 10), and the like. The memory 67 is adapted to store a complete set of the information to be displayed. According to a preferred embodiment, the memory 67 has sufficient capacity to store multiple sets of information, and the processor 90 could include a program for alternating or cycling between various sets of display information. This feature enables the display 54 to show a variety of effects conducive for quickly conveying motor state information to a user.

The memory 67 includes read only memory (ROM) and random access memory (RAM). The ROM contains among other code the Basic Input-Output System (BIOS) which controls the basic hardware operations of the diagnostic apparatus 50. The RAM is the main memory into which the operating system and application programs are loaded.

The display 54 is coupled to the processor 90 via a display driver circuit 95 as is conventional. The display 54 may be a liquid crystal display (LCD) or the like. In the preferred embodiment, the display 54 is a fine pitch liquid crystal display operated as a standard CGA display with a resolution of 640×200 pixels. The display 54 functions to display data or other information relating to ordinary operation of the motor 30. For example, the display 54 may display a set of discrete motor condition indicia such as, for example, fault indicia, caution indicia, and normal operation indicia which is displayed to the operator and may be transmitted over a system backbone (not shown). Additionally, the display 54 may display a variety of functions that are executable by the motor 30. The display 54 is capable of displaying both alphanumeric and graphical characters.

Power is provided to the processor 90 and other components forming the diagnostic apparatus 50 from a control and sensor power unit 97. However, it will be appreciated that such power could be obtained from the motor power leads 99 themselves via power converting circuitry (not shown).

The diagnostic apparatus 50 includes a communication subsystem 64 which includes a data communication port, which is employed to interface the processor 90 with the host computer 66 via the network 68 (FIG. 1). The diagnostic apparatus also includes its own RF section 101 connected to the processor 90. The RF section 101 includes an RF receiver 103 which receives RF transmissions from the host computer 66 for example via an antenna 105 and demodulates the signal to obtain digital information modulated therein. The RF section 101 also includes an RF transmitter 107 for transmitting information to the network backbone 68 or host computer 66 for example in response to an operator input at input device 60.

It should be appreciated that the present invention may be employed in a system which does not include a display driver, display, operator input device and central computer. All processing including data synthesis and state estimation could be accomplished by an on-board computer and the results transmitted to a PC or a control computer such as a programmable logic computer (PLC) (not shown). Furthermore, only 1 data link may be required. According to another embodiment, the processor 90 could be employed to simply trigger a single bit, digital output which may be used to open a relay and turn the motor 30 off.

Figure 4:
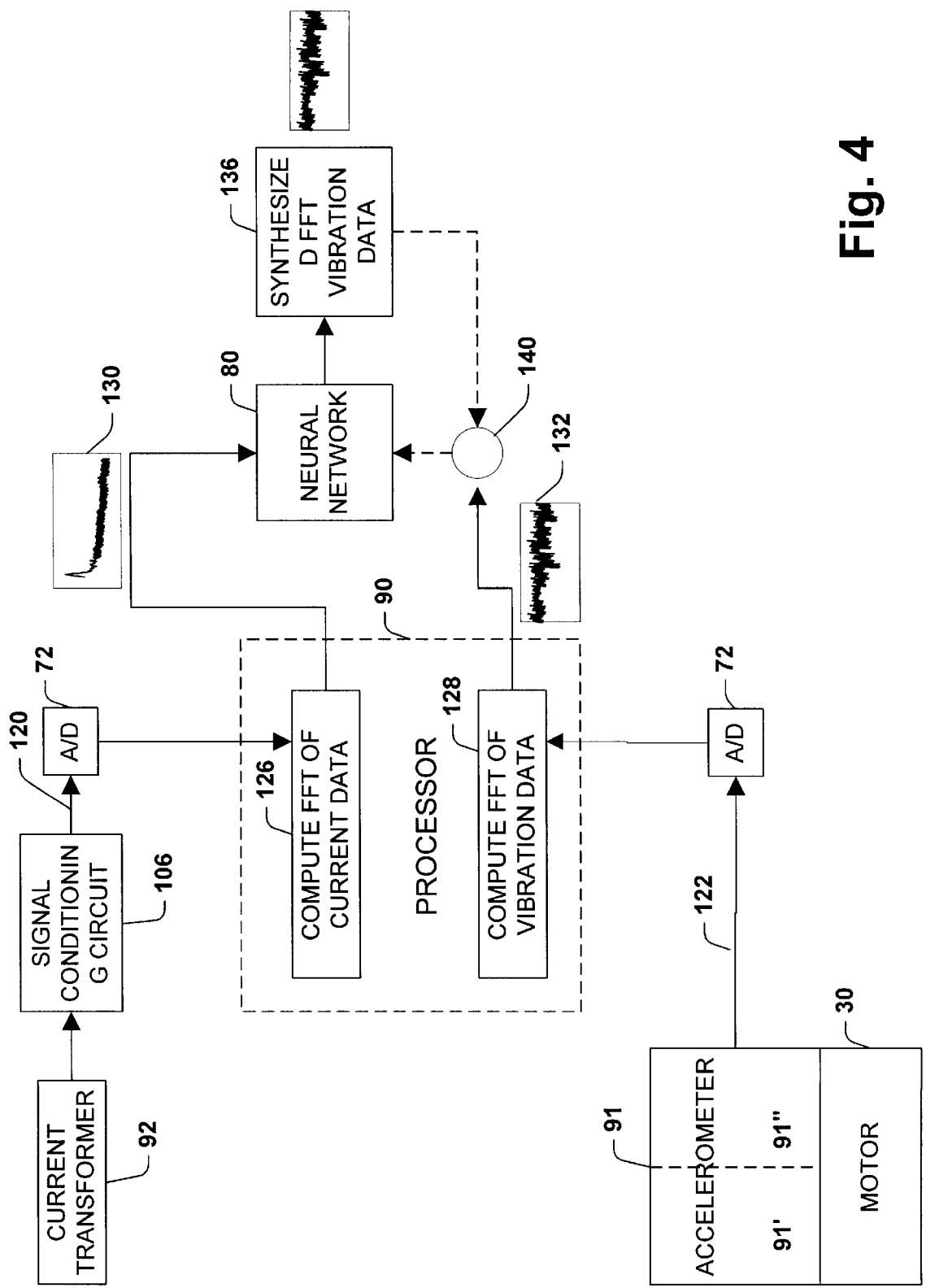
FIG. 4 is a functional block diagram illustrating the training of a neural network to synthesize vibration signals in accordance with the present invention.

Turning now to FIG. 4, a functional block diagram representing the training of the neural network 80 to synthesize vibration data from instantaneous current data is shown. Initially, a test motor 30 is employed to train the neural network 80. Once the neural network 80 has been trained for the particular test motor 30, the neural network 80 can be replicated many times over and be integrated into a plurality of motors of like kind to the test motor to facilitate diagnosis thereof.

The test motor 30 is equipped with at least one vibration sensor 91 such as an accelerometer for taking sampled vibration data relating to the operation of the motor 30. In the preferred embodiment, a set of vibration sensors 91 is mechanically connected to the casing of the motor 30. A three-axis accelerometer 91' is located at the load bearing side of the test motor 30, and a two-axis accelerometer 91" is located at the other side of the motor 30. However, the present invention can be carried out with one, single-axis accelerometer. Preferably, the vibration sensors 91 are laboratory-grade accelerometers such as those manufactured by PCB Piezoelectronics, Inc. Part No. 353B16 and providing 10 mv/g. However, it will be appreciated that any vibration sensor or proximity sensor suitable for carrying out the present invention may be employed. As mentioned above, the analog signals 122 from the vibration sensors 91 are converted to digital signals by the A/D converter 72 for use by the neural network 80.

The test motor 30 is also equipped with current sensors 92 such as for example current transformers for taking current data relating to the operation of the motor 30. The current transformers 92 may be located on the lead power wires 99 close to the motor 30 itself or they may be located at the other end of the lead wires 99 in the MCC 100 (FIG. 12), for example. The current transformers 92 may alternatively be located in the MCC 100 in order to facilitate installation and data acquisition. Both the sampled analog current data 120 and sampled analog vibration data 122 are input to the A/D 72 so as to be converted to digital form for processing by the processor 90. The sampled analog current signal 120 has passed through signal conditioning circuit 106 prior to entering the A/D 72. The accelerometer 91 performs its own signal conditioning and therefore its analog vibration signal 122 is input directly to the A/D 72.

The processor 90 controls the signal sampling and digitizing rate as well as any buffering of the digitized signals 120, 122 that might be needed.

The data collection rate is carried out at for example 5000 samples per second over a period of 25 seconds. This data collection rate provides sufficient data upon which the processor 90 can generate a comprehensive frequency spectrum of the motor current and motor vibration signal suitable for analysis using commercially available Fast Fourier Transform software 126, 128 such as for example MATLAB by The Math Works. The FFTs of the current signal data and the vibration signal data are discretized over N number of points for ease of processing. In the preferred embodiment, N=512, however, it will be appreciated that the FFTs of each signal may be discretized over any suitable number of points. Amplitudes of current at discrete frequencies (512 points) are fed as inputs to the neural network 80 and corresponding vibration amplitudes at the same frequencies are generated.

Figure 5A:
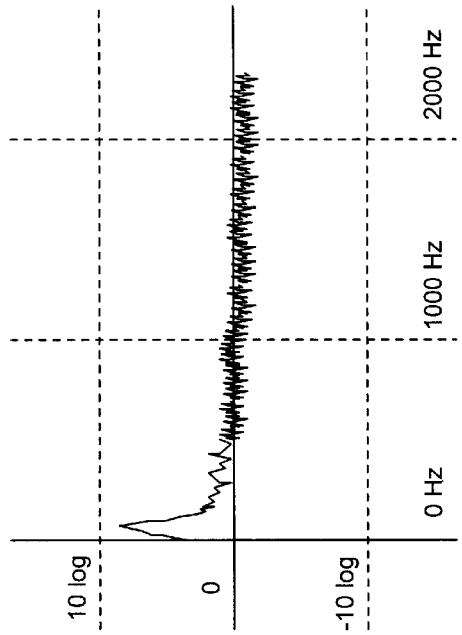
FIG. 5a is a graph of an instantaneous motor current signal for a motor having good bearings in accordance with the present invention.
Figure 5B:
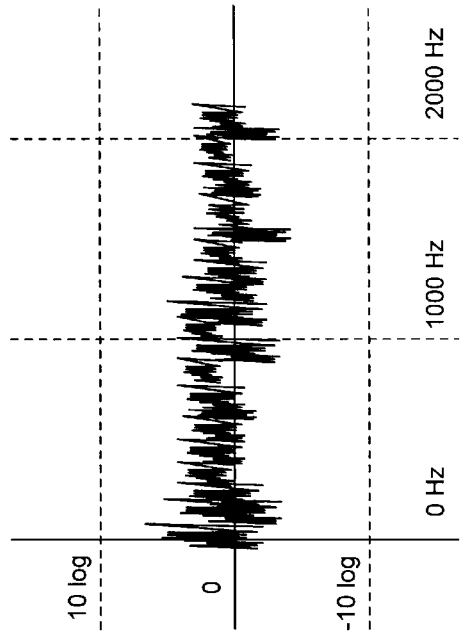
Figure 5C:
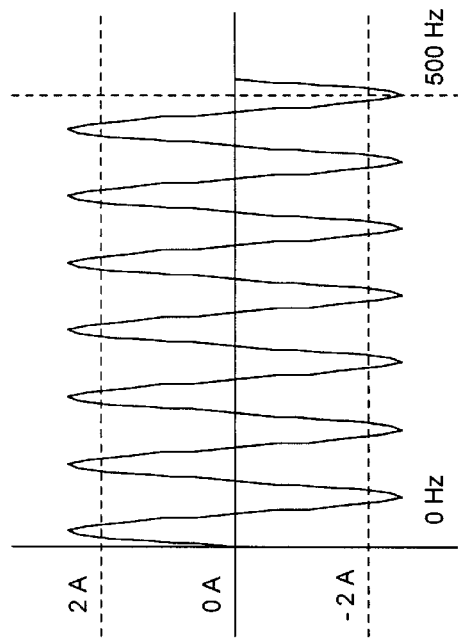
FIG. 5c is a graph of a vibration signal for a motor having good bearings in accordance with the present invention.
Figure 5D:
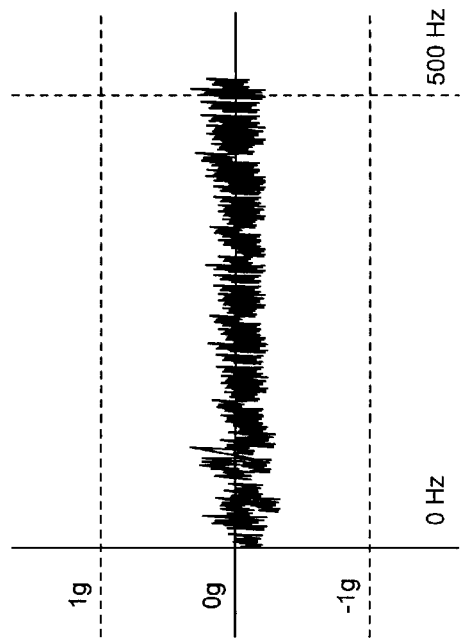
FIG. 5d is a graph of a Fast Fourier Transform signal representative of the vibration signal of FIG. 5c.

Referring briefly to FIGS. 5a–6d, representative graphs of motor current data, transformed motor current data, motor vibration data and transformed motor vibration data for the motor 30 with good bearings and the motor 30 with bad bearings are shown. In particular, FIG. 5a is a plot of raw, sampled time domain, current data of a motor 30 with good bearings. FIG. 5b is a corresponding frequency spectrum plot of the raw current data of FIG. 5a. FIG. 5c is a plot of the raw acceleration (i.e., vibration data) taken during the same time frame as the raw current data of FIG. 5a. FIG. 5d is a frequency spectrum plot corresponding to the raw acceleration data of FIG. 5c.

Figure 6A:
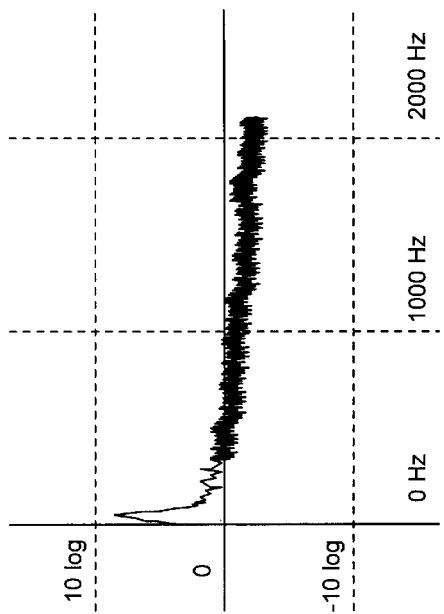
FIG. 6a is a graph of an instantaneous motor current signal for a motor having a bad bearing in accordance with the present invention.
Figure 6B:
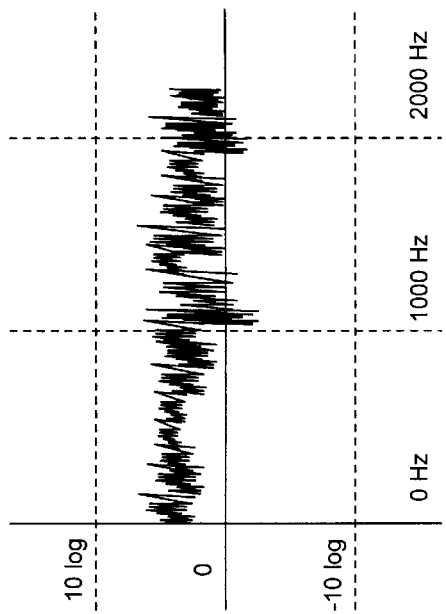
Figure 6C:
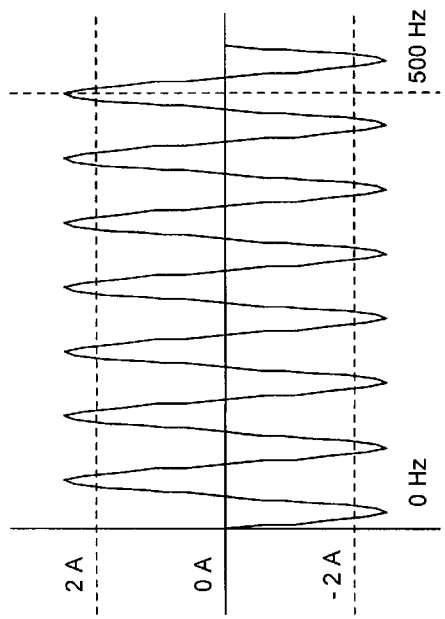
FIG. 6c is a graph of a vibration signal for a motor having a bad bearing in accordance with the present invention.
Figure 6D:
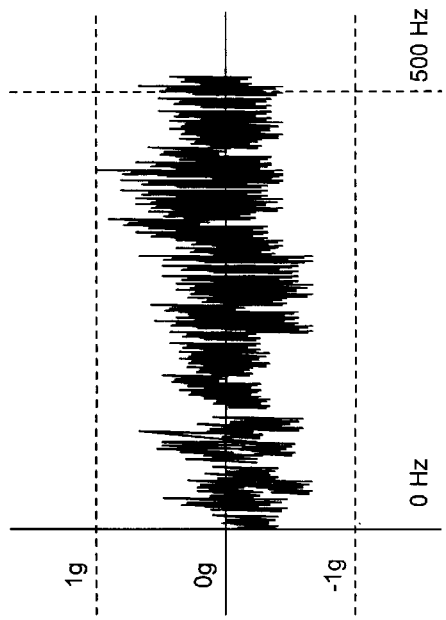
FIG. 6d is a graph of a Fast Fourier Transform signal representative of the vibration signal of FIG. 6c.

FIG. 6a is a plot of raw current data of the motor 30 with a bad bearing. In this example, bearing surfaces have been degraded by operating the motor with lubrication contaminated with silicon carbide (SiC) grit. FIG. 6b is a corresponding frequency spectrum plot of the raw current data of FIG. 6a. FIG. 6c is a plot of the raw acceleration (ie., vibration data) taken during the same time frame as the raw current data of FIG. 6a. FIG. 6d is a frequency spectrum plot corresponding to the raw acceleration data of FIG. 6c.

Returning back to FIG. 4, the processor 90 inputs the transformed current data 130 to the neural network 80. The transformed vibration data 132 is simultaneously input to a comparator 140 (see also FIG. 7) which is used in the training process of the neural network 80. The output 136 (synthesized FFT vibration signal data) of the neural network 80 is input to the comparator 140 to be compared against the FFT vibration signal 132. The neural network 80 is then trained (i.e., via back propagation) in the manner described herein to output a synthesized vibration frequency spectrum 136 (based on the input current spectrum) that matches the input vibration spectrum 132. An iterative procedure is repeatedly performed whereby the output synthesized frequency spectrum 136 is compared against the input vibration frequency spectrum 132 via a comparator 140 until it substantially matches. Greater details as to the training of the neural network 80 are presented below.

Figure 7:
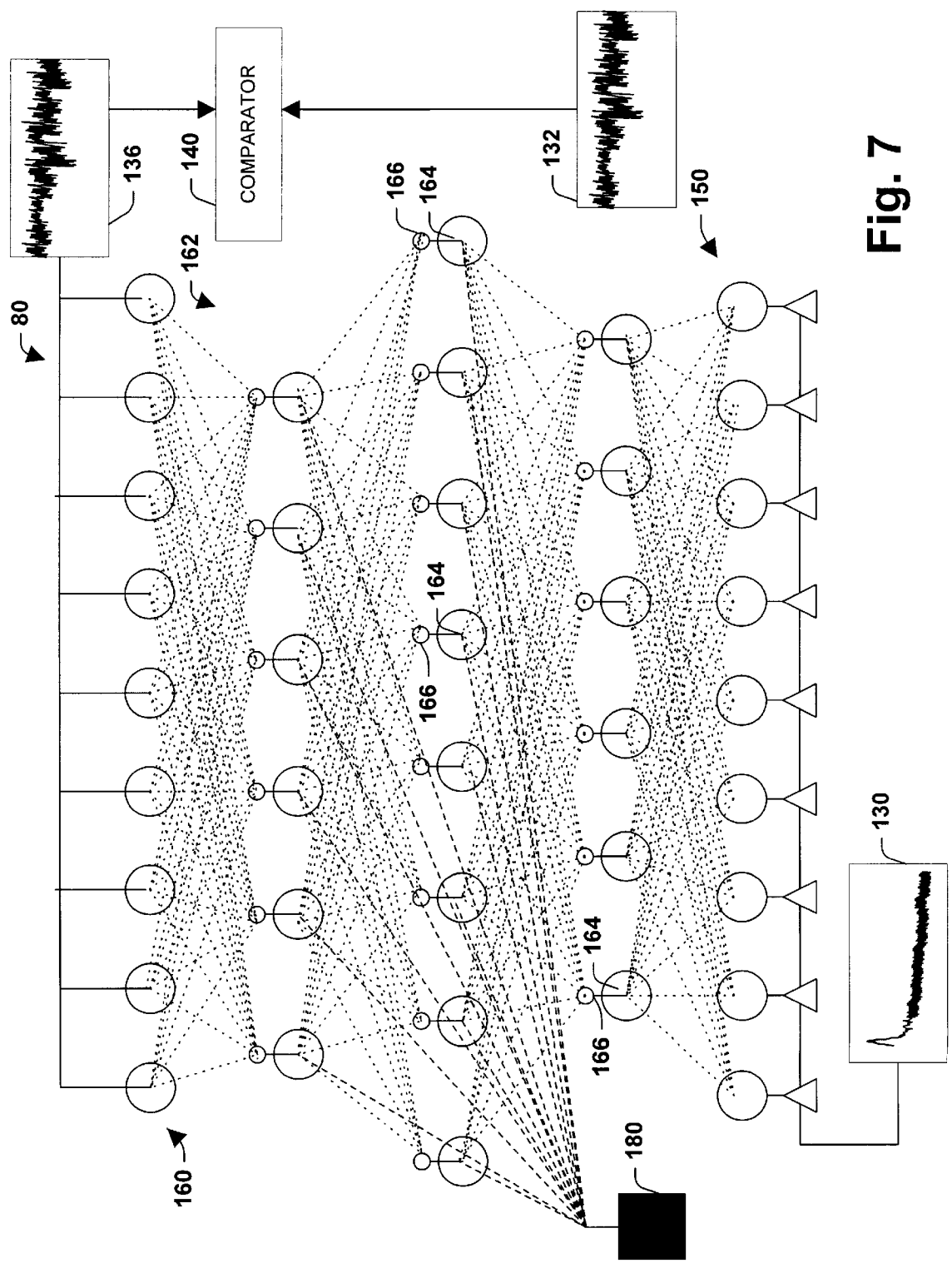
FIG. 7 is a diagram of a five layered neural network in accordance with the present invention.

Turning now to FIG. 7, an exemplary neural network 80 in accordance with the present invention is shown. As mentioned above, the neural network 80 is trained to extract (i.e., synthesize) vibration data from sampled current data. Any suitable neural network and/or data synthesis routine or algorithm for carrying out the present invention may be employed such as for example one created using NeuralWorks by NeuralWare of Pittsburgh, Pennsylvania. Exemplary teachings for implementing a suitable neural network suitable for use in the present invention are found in U.S. Pat. No. 5,003,490 entitled NEURAL NETWORK SIGNAL PROCESSOR, and David E. Rumelhart et al., *Parallel Distributed Processing: Explorations in the Microstructure of Cognition*, Vol. 1 (1988), The MIT Press, Cambridge, Mass. Both of these references are hereby incorporated by reference in their entireties.

The term neural network or, more properly, artificial neural network (ANN) has come to mean any computing architecture that consists essentially of massively parallel interconnections of simple "neural" processors. Artificial neural networks can be employed as universal approximators. In the present invention, the neural network 80 is trained using supervised learning to take as input sampled current data and generate a vibration signal as if it had been obtained from an accelerometer. The basic building block of many neural networks is the adaptive linear element. This is an adaptive threshold logic element which comprises an adaptive linear combiner cascaded with a hard limiting quantizer which is used to produce a binary output. In single element neural elements, an adaptive algorithm is often used to adjust the interconnection weights of the adaptive linear elements so that they respond correctly to as many patterns as possible in a training set that has binary desired responses. Once the interconnection weights are adjusted, the responses of the trained element can be tested by applying various input patterns. If the adaptive linear element responds correctly with high probability to input patterns that were not included in the training set, it is said that "generalization has taken place. Thus learning and generalization are among the most useful attributes of adaptive linear elements in neural networks.

The neural network 80 requires minimal software because the algorithms are developed by the neural network 80 itself through training. The neural network 80 includes a plurality of rows of individual processors or"neurons" arranged in a configuration of the general class known as a Multilayer Perceptron. In a Multilayer Perceptron, the neurons are arranged in three or more layers. Each neuron produces an output which is some predetermined function of its input. The first, or input, layer includes neurons deemed input neurons 150, and the neurons in the last layer are called output neurons 160. The neurons 150, 160 may be constructed from a wide variety of conventional digital or analog devices. For example, op amps may be used for the neurons 150, 160. One or more inner layers comprise neurons called hidden neurons 162. While only several neurons are shown in each layer, it is to be appreciated that any number of neurons may be employed to carry out the present invention depending on the particular need. Each neuron in each layer is connected to each neuron in each adjacent layer. Likewise, each inner neuron 162 is connected to each neuron in the next adjacent layer. The next layer may include additional inner neurons 162 or the output neurons 160. The network described above is referred to as a feed forward neural network.

Each of the connections 164 between the neurons contain weights or "synapses" 166 (only some of the connections 164 and synapses 166 are labeled with reference numbers for ease of understanding). These synapses 166 may be implemented with variable resistance, or with amplifiers with variable gains, or with FET connection control devices utilizing capacitors, for example. The synapses 166 serve to reduce or increase the strength of the connections 164 between individual neurons. While the connections 164 are shown with single lines, it is to be understood that two individual lines may be employed to provide signal transmission in two directions, since the reverse direction will be required during the training period. The value of the connection strength of each synapse 166 may vary from some predetermined maximum and minimum value. When the weight is zero there is in effect no connection between the two neurons.

The process of training the neural network 80 to extract (i.e., synthesize) a particular vibration data signal from a corresponding current data signal involves adjusting the connection strength of each synapse 166 in a repetitive fashion until the desired output (e.g., a synthesized equivalent vibration data signal from the sampled current data signal) is produced in response to a particular input. More specifically, during training the FFT of a sampled current data signal 130 is fed to the input layer neurons 150. A particular output 136 is produced from the neural network 80 which is a function of the processing by each neuron and the weighting value of each synapse 164. The output 136 is input into the comparator 140 which is compared against the FFT of the vibration signal 132 obtained from the accelerometer 91. A bias 180 is also applied to the hidden neurons 162 to eliminate any offsets that may result during the weighting process. This iterative process of weighting the connections is repeated until the neural network is trained to synthesize an FFT vibration signal that matches the measured FFT vibration signal 132 obtained from the accelerometer 91.

More particularly, the neural network 80 is trained using back propagation via the comparator 140 to produce an output 136 that substantially matches the FFT of the vibration data 132 based on a corresponding FFT for the current data 130. The learning process adjusts the interconnection weights until the desired output is produced. Once the neural network 80 has been trained, the neural network 80 will produce a synthesized FFT vibration signal 136 from only the FFT current signal 130 that substantially matches the FFT of the measured vibration data 132.

In other words, it has been found that vibration data corresponding to the diagnostic state of a machine is encoded in the instantaneous current data of the motor 30. Thus, by training the neural network 80 to correlate current signature with vibration signature it is possible to synthesize equivalent vibration signatures 136 from current signatures 130. By repeating the aforementioned neural network training procedure, it is possible to produce a synthesized vibration signature from sampled current data alone. It will be appreciated that the neural network 80 can be trained to produced equivalent FFT vibration signals (i.e., vibration signatures) from the FFT current signals despite the presence of noise or degraded current data. It is to be appreciated that the neural network 80 can be trained to extract a substantially vast number of vibration signatures from sampled current data.

Figure 8:
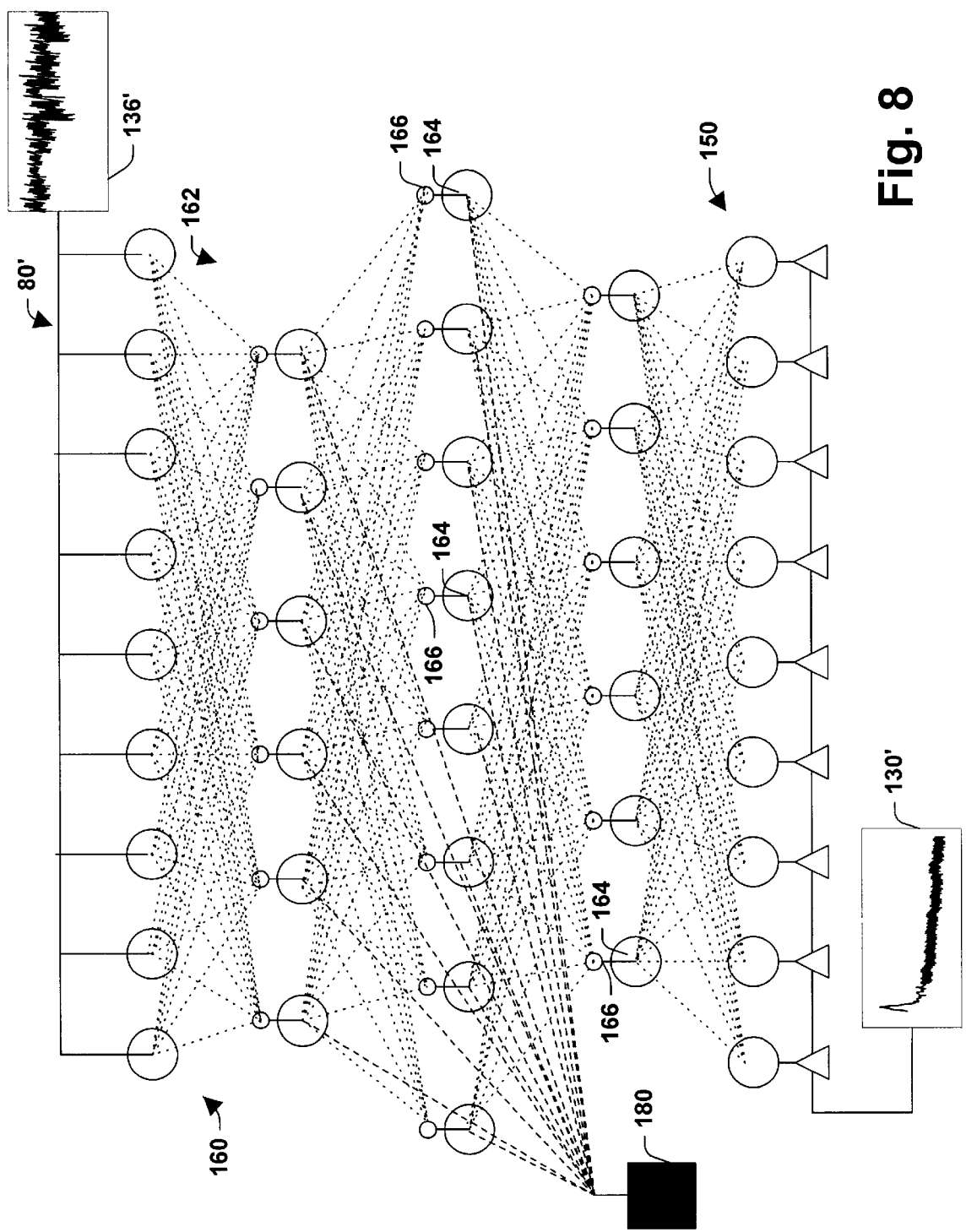
FIG. 8 is a diagram of the five layered neural network of FIG. 7 after it has been trained to synthesize vibration signals from current signals in accordance with the present invention.
Figure 9:
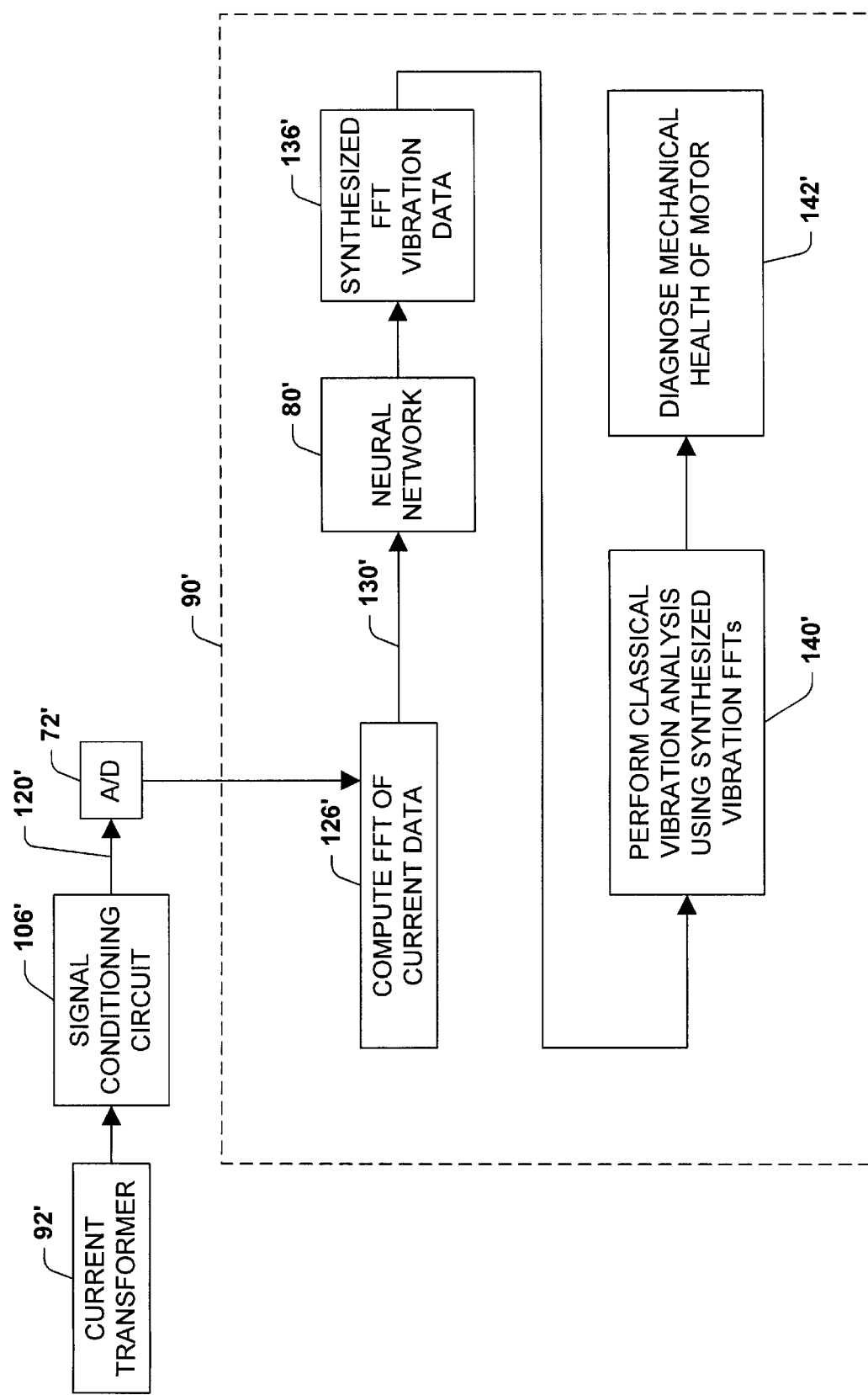
FIG. 9 is a functional block diagram representing the training of a neural network to synthesize vibration signals from current signals in accordance with the present invention.

Turning now to FIGS. 8 and 9, a trained neural network 80' and a functional block diagram illustrating the synthesis via the trained neural network 80' of FFT vibration signals from only transformed raw current data 130' is shown. The neural network 80' has been trained according to the discussion above. According to this specific example, the trained neural network 80' has now been integrated into a motor 30' located in the field. This motor 30' is not equipped with a vibration sensor 91 such as an accelerometer.

However the motor 30' is equipped with at least one current sensor such as for example current transformers 92' for taking current data relating to the operation of the motor 30'. The output 120' of the current transformer 92' (i.e., the current transformer secondary) is input via the signal conditioning circuit 106' to the A/D 72' so as to be converted to digital form for processing by the processor 90'. The processor 90' controls the signal sampling and digitizing rate as well as any buffering of the signal that might be needed. The data collection rate is carried out at for example 5000 samples per second over a period of 25 seconds. This data collection rate provides sufficient data upon which the processor 90' can generate a comprehensive frequency spectrum of the motor current signal suitable for analysis using commercially available Fast Fourier Transform software 126'. The processor 90' inputs the transformed current data 130' (i.e., FFTs of the current data) to the trained neural network 80'. The trained neural network 80' outputs a synthesized vibration frequency spectrum 136' (based on the input FFT current signal 130' alone). The synthesized FFT vibration signal 136' is substantially the same as the FFT vibration signal that would have been output by an accelerometer 91 if it were coupled to the motor 30' in the manner described above. Since the neural network 80' has been trained to extract the vibration frequency spectrum from the raw current data, the accelerometer 91 is no longer needed. The processor 90' next employs classical vibration analysis in step 140' using the synthesized vibration frequency spectrum 136'. The processor 90' then is able to diagnose the mechanical health of the motor 30' using classical vibration analysis in step 142'. Thereafter, the processor 90' can carry out various operations relating to its motor diagnosis such as display/transmit to a user motor status information, and/or initiate an alarm and/or institute protection control steps.

Turning now to FIG. 10, a table 200 is shown which the processor 90' accesses when performing the classical vibration analysis in step 140' to diagnose the health of the motor 30' in step 142'. The table 200 includes vibration amplitude data ($A_0$ thru $A_Z$) over a range of frequencies ($f_0$ thru $f_N$). The table 200 is stored in the memory 64 of the diagnostic apparatus 50 so as to be easily accessible by the processor 90'. The table 200 includes various health states of the motor shown generally at 202 which correspond to vibrations amplitudes over the frequency range $f_0$ thru $f_Z$. For example, referring to the row identified by reference numeral 204, when the vibration amplitudes are $A_{234}$ at $f_0$, $A_{27}$ at $f_1$, $A_{478}$ at $f_2$, $A_{24}$ at $f_3$, $A_{127}$ at $f_4$, . . . , $A_Q$ at $f_N$, the table 200 indicates that the motor 30 has a bad bearing. As will be appreciated the table 200 can store an enormous amount of vibrations signatures corresponding to various health states of the motor 30, which the processor 90 can employ to diagnose the health of the motor 30.

The processor 90' may utilize various analytical techniques such as those which generally fall under the category of classical vibration analysis which have been proven to detect certain mechanical problems such as, for example, bearing failure, rotor problems, contamination from water or grit, holes in bearings, flat areas on bearings, broken or loose motor mounting, misalignment of motor shaft and load shaft, bent shafts, loose couplings, stator winding problems, fan problems, etc.

Figure 11:
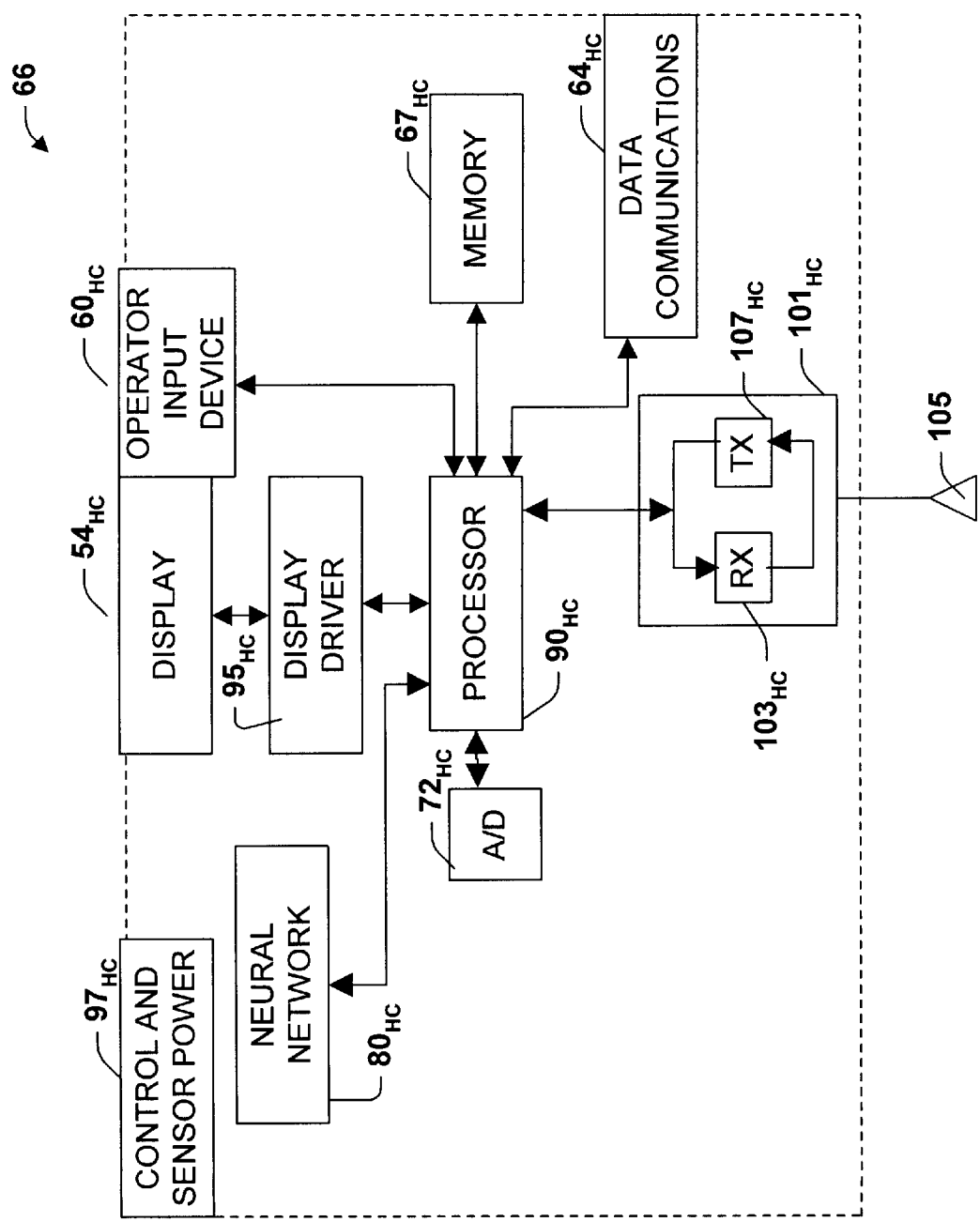
FIG. 11 is a functional schematic diagram of a host computer adapted for motor diagnosis in accordance with the present invention.

Turning now to FIG. 11, another aspect of the present invention is shown wherein the host computer 66 functions to carry out the operations of the diagnostic apparatus 50 (FIG. 2) in order to carry out classical vibration analysis (using synthesized vibration data) on a plurality of motors. The host computer 66 includes essentially the same components as the diagnostic apparatus 50 except for the motor related parts. Accordingly, like parts between the host computer 66 and the diagnostic apparatus 50 will share like reference numerals. However, the reference numerals of FIG. 11 for the host computer further include the subscript (HC) to designate that the component is associated with the host computer 66. Further discussion as to the functioning of the components is not repeated for sake of brevity and to avoid redundancy.

Turning now to FIG. 12, the host computer is shown as part of a system 250 where the host computer 66 performs classical vibration analysis (using synthesized vibration data) on a plurality of motors $30_A$–$30_D$. Although only four motors are shown as part of the system 250, it will be appreciated that virtually any number of motors (or other types of machines where classical vibration analysis can be employed thereon) may be employed in this system 250. The motors $30_A$–$30_D$ are each individually tied to the motor control center 100. As mentioned above, the MCC 100 is often used with industrial-rated electric motors to start, control and protect the electric motors and their associated electric circuitry. The motor control center 100 contains motor starters to start and stop the motors along with circuit breakers to protect the electric motors and electric wiring. The motor current sensors 92 are enclosed within the MCC 100. Each respective motor $30_A$–$30_D$ has current sensor(s) coupled to its respective lead wire(s) to obtain current signal data. The current signal data is conditioned in the manner as described above with reference to FIGS. 3 and 4. The digitized current signal data 120 for each motor $30_A$–$30_D$ is applied to a channel interface 252. The channel interface 252 includes a separate channel for each motor of the system 250. The channel interface 252 is coupled to the host computer 66.

The host computer 66 cycles through each channel at predetermined intervals to obtain current data with respect to each motor $30_A$–$30_D$. The host computer 66 then essentially carries out the same steps as described above with reference to FIG. 9 as to performing classical vibration analysis (using synthesized vibration signal data) to determine the states of the motors $30_A$–$30_D$. The advantage of this system 250 is that it allows for the analysis of a plurality of motors by a single computer 66. In this way, a user of the host computer 66 could monitor and analyze a substantial number of motors or machines within a facility from a single location.

It will also be appreciated that the host computer 66 may be located at a remote facility far away from the motors $30_A$–$30_D$. For example, a manufacturer of motors located in the United States could analyze motors located in a plant in Russia via the above system 250. The host computer 66 being located in the United States could be linked to the channel interface 252 of the MCC 100 via a suitable communication link. The manufacturer having access at his/her end to vast amounts of historical data relating to the particular motors $30_A$–$30_D$ could quickly perform a diagnosis of the state of the machines using the synthesized vibration signal data. The manufacturer now knowing what is probably wrong with the motors and what is involved with fixing the motors could then take appropriate measures (e.g., sending a motor expert to the Russian facility with the right repair or replacement equipment) to correct the machinery problems.

Other benefits of monitoring multiple motors remote from the motors in an MCC include reduced installation and wiring costs (which make many other systems cost-prohibitive), reduced cost due to sharing a single processor and power for the computer, avoiding costly enclosures and packaging for in-field installation of a processor and sensors near the motor (especially for explosive environments), and the ability to readily combine vibration analysis from multiple motors to perform system-level diagnostics such as for a conveyor system or a multi-motor system with load sharing.

Although the present invention has been described with respect to obtaining Fast Fourier Transforms of the current signals and vibration signals, it should be appreciated that other suitable techniques may be employed. For example, referring now to FIG. 13, wavelet transforms may be taken of the current data. Since an original signal C<n> can be recovered from, for example, a polynomial sequence having coefficients C<0>, D<0>, D<1>, . . . , D<n−1>, this sequence can be thought of as a transform of the original signal, and is known as a wavelet transform. One advantage to using the wavelet transform is that the total size of the transform C<0>, D<0>, . . . , D<n−1> is a compact representation of the original signal and will require considerably less storage than the original signal.

Wavelet transforms have a number of properties that make them attractive for signal processing. For example, if filters are constructed to be sparse, then a filter bank operation can be performed very quickly. Also, for many of the signals encountered in practice, a large percentage of the entries in the wavelet transform are negligible. Wavelet compression methods can therefore approximate the original set of samples in C<n> by storing only the significant coefficients of the wavelet transform.

Wavelets have a variety of applications, for example, wavelets have been used in signal analysis, as discussed in Mallat, "*A theory for Multiresolution Signal Decomposition: The Wavelet Representation,*" IEEE transactions on Pattern Analysis and Machine Intelligence 11(7):674–693, July 1989. Wavelets have also been used in image processing and numerical analysis, as discussed in DeVore, Jawerth, and Lucier, "*Image Compression Through Wavelet Transform Coding*", IEEE Transactions on Information Theory 38(2):719–746, March 1992 and Beylkin, Coifman and Rokhlin, "*Fast Wavelet Transforms and Numerical Algorithm I,*" Communications on Pure and Applied Mathematics 44:141–183, 1991, respectively. All of these references are hereby incorporated by reference in their entirety.

Figure 13:
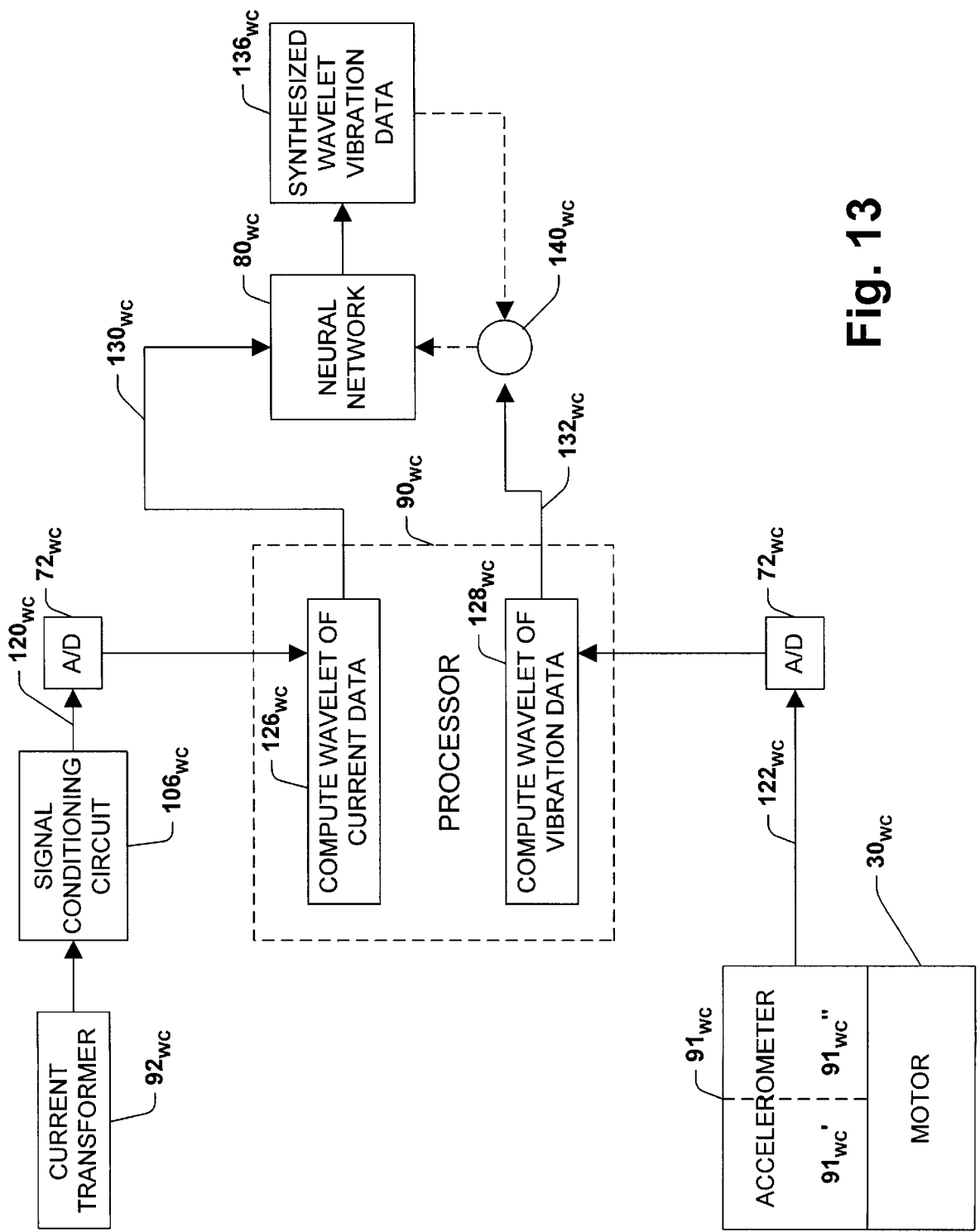
FIG. 13 is a functional block diagram illustrating the training of a neural network to synthesize vibration signals using wavelets in accordance with the present invention.

All that is required for performing a wavelet transform is an appropriate set of analysis and synthesis filters. By using the wavelet transform with the neural network $80_{WC}$, a much smaller, compact, training set can be employed, which still enables the present invention to reconstruct the original signal information. The functional block diagram of FIG. 13 is like that of FIG. 4, wherein like parts are indicated by like reference numerals. However, in FIG. 13, the reference numerals include the subscript (WC) to indicate the use of wavelets as opposed to FFTs. In FIG. 13, rather than using FFTs, the processor $90_{WC}$ computes wavelets of the current data and vibration data at $126_{WC}$ and $128_{WC}$, respectively. At step $136_{WC}$, the neural network $80_{WC}$ synthesizes wavelet vibration data.

One particular example of using the compact representation property of wavelets is to generate the wavelet transforms of raw sampled current and raw sampled vibration. The transform coefficients of current are then input to a neural network such as $80_{WC}$ and trained via supervised learning to generate the wavelet coefficients for the vibration signal. After training, wavelet coefficients from sampled current data are input to the neural net and wavelet coefficients for a vibration signal are generated. Since these coefficients are a compact representation of the signal, these coefficients can be used directly to perform machinery diagnosis using joint time-frequency domain methods or the wavelet coefficients may be generated and used to reconstruct a pseudo-sampled vibration signal. The reconstructed vibration signal may then be analyzed using classical signal processing techniques such as frequency spectrum techniques as described above.

This approach also affords for a psuedo frequency domain and time domain analysis of the signal data. Combining wavelet coefficients with the neural network $80_{WC}$ may provide robust estimates of fractal dimension even in the presence of significant noise. Such a combination involves relative simplicity of implementation while affording great flexibility in accommodating a broad range of signal types and noise levels.

It should also be appreciated that the present invention is extendable to other embodiments including different signal types and/or machinery. For example, acoustic information obtained from a low cost acoustical sensor could be employed on a gear box (i.e., non-motor device) to synthesize vibration. As another example, high frequency acoustic signals may be employed to synthesize pressure fluctuations for pump diagnostics. Thus the present invention can be employed to train a neural network 80 to synthesize data relating to substantially any first signal which has data relating thereto encoded in a second signal. In other words, if data relating to the first signal is encoded in the second signal, the present invention may be employed to train the neural network 80 to synthesize the first signal from the second signal.

Furthermore, although the present invention has been described above with respect to state estimation, it will be appreciated that the information obtained from the present invention may be used over time for state prediction (i.e., failure prediction).

The present invention affords for machine diagnosis through vibration signature analysis without the need for employing expensive vibration sensors on the machine being diagnosed. In other words, since vibration signature data is encoded in the instantaneous machine current data, the present invention allows for extracting vibration signature data from the current signature data. As a result, expensive sensors (e.g., accelerometers) do not have to be equipped to the machine being diagnosed in order for vibration signature analyses to be performed. The present invention makes it possible to take advantage of the large amount of historical vibration signature analysis techniques currently available for machine diagnosis. By obtaining vibration signature data from the readily available current data, an analysis of the machine can be carried out at low cost because sensors no longer have to be used to obtain the vibration data from the machine being analyzed. Moreover, the avoidance of having to employ vibration sensors provides for increased reliability since current signal data can be obtained in a much more reliable and consistent manner as compared to obtaining vibration data via vibration sensors.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for training a neural network to synthesize vibration data relating to the operation of a machine, comprising:

a first sensor operatively coupleable to the machine, the first sensor adapted to obtain at least one vibration signal relating to the operation of the machine;

a second sensor operatively coupleable to a power lead of the machine, the second sensor adapted to obtain at least one current signal relating to the operation of a machine; and a neural network operatively coupleable to the second sensor, the neural network being trainable to generate at least one synthesized vibration signal from the current signal, wherein the synthesized vibration signal is substantially equivalent to the vibration signal obtained from the first sensor.

2. The system of claim 1, wherein the first sensor is an accelerometer.

3. The system of claim 2 wherein the second sensor is a current transformer.

4. The system of claim 1, further including a processor operatively coupleable to the first and second sensors, the processor adapted to generate fast fourier transforms of the at least one vibration signal and the at least one current signal.

5. The system of claim 4, wherein the processor inputs the fast fourier transform of the at least one current signal to the neural network, and inputs the fast fourier transform of the at least one vibration signal to a comparator, the comparator being operatively coupleable to the neural network.

6. The system of claim 5, wherein the comparator compares a synthesized vibration signal generated by the neural network against the fast fourier transform of the at least one vibration signal.

7. The system of claim 1, further including a processor operatively coupleable to the first and second sensors, the processor adapted to generate wavelet transforms of the at least one vibration signal and the at least one current signal.

8. The system of claim 1, wherein the current signal corresponds to instantaneous values of current.

9. The system of claim 1, wherein the neural network is an autoassociator trained using current signal values and vibration signal values obtained from the machine operating in various known states.

10. The system of claim 1, wherein the neural network includes:
   a plurality of neurons adapted to receive signals and adapted to present an output;
   a plurality of connective synapses providing a weighted coupling between the neurons;
   wherein the neural network is capable of adapting itself to produce a predetermined output in response to an input by changing the value of the weighted coupling between the neurons.

11. The system of claim 1, wherein the machine is an AC induction motor.

12. The system of claim 1, wherein the machine is a pump.

13. The system of claim 1, wherein the machine is a generator.

14. A method for synthesizing vibration data, comprising the steps of:
   collecting at least one sample of vibration data signal relating to the operation of a machine;
   collecting at least one sample of current data signal relating to the operation of the machine;
   inputting the at least one sample of current data signal to a neural network; and
   using the neural network to synthesize at least one vibration data signal from the at least one sampled current data, the at least one synthesized vibration signal being substantially equivalent to the at least one sample of vibration data signal.

15. The method of claim 14, wherein the step of collecting at least one sample of vibration data signal relating to the operation of the machine is accomplished by employing a vibration sensor.

16. The method of claim 15, further including the step of inputting the at least one sample of vibration data signal to a comparator operatively coupleable to the neural network, wherein the comparator compares the output of the neural network against the at least one sample of vibration data signal out from the accelerometer.

17. The method of claim 14, wherein the step of collecting at least one sample of current data signal relating to the operation of the machine is accomplished by employing a current transformer.

18. The method of claim 14, further including the step of training the neural network to use current signal values and vibration signal values obtained from the machine operating in various known states, wherein the neural network includes: a plurality of neurons adapted to receive signals and adapted to present an output; a plurality of connective synapses providing a weighted coupling between the neurons; wherein the neural network is capable of adapting itself to produce a predetermined output in response to an input by changing the value of the weighted coupling between the neurons.

19. A system for diagnosing a machine using synthesized vibration data, comprising:
   a sensor for obtaining current data relating to the operation of a machine;
   a neural network operatively coupleable to the sensor, the neural network adapted to synthesize a vibration signal from the sampled current data, and
   a processor operatively coupleable to the neural network, the processor adapted to receive the synthesized vibration signal and employ the synthesized vibration signal to facilitate diagnosing the state of the machine, the synthesized vibration signal being substantially equivalent to a vibration signal that would be obtained from a vibration sensor if Attached to the machine.

20. The system of claim 19, wherein the sensor is a current transformer.

21. The system of claim 19, wherein the processor performs classical vibration analysis on the machine using the synthesized vibration signal.

22. The system of claim 21, further including a memory operatively coupleable to the processor, the memory adapted to store historical vibration analysis data which the processor can access when performing the classical vibration analysis.

23. The system of claim 19, wherein the machine is an AC induction motor.

24. The system of claim 19, wherein the machine is a pump.

25. The system of claim 19, wherein the machine is a generator.

26. A method for diagnosing a machine, comprising the steps of:
   collecting at least one sample of current data relating to the operation of the machine;
   inputting the at least one sample of current data to a neural network;
   using the neural network to synthesize a vibration data signal from the at least sample of current data, the synthesize vibration data signal being substantially equivalent to a vibration signal that would have been obtained from a vibration sensor if attached to the machine;
   determining the diagnostic state of the machine from the synthesized vibration data signal.

27. The method of claim 26, wherein the step of collecting at least one sample of current data signal relating to the operation of the machine is accomplished by employing a current transformer.

28. The method of claim 26, wherein the step of determining the diagnostic state of the machine from the at least one synthesized vibration data signal is accomplished via a processor employing classical vibration analysis.

29. The method of claim 28, further including the step of using the processor to access historical vibration analysis data stored in a memory operatively coupleable to the processor.

30. A system for diagnosing a plurality of machines using synthesized vibration data, comprising:
   a plurality of sensors for obtaining current data relating to the operation of the plurality of machines;

a channel interface operatively coupleable to the plurality of sensors, the channel interface designating a separate channel for the current data obtained from each of the plurality of sensors, respectively;

a host computer operatively coupleable to the channel interface, the host computer including a neural network operatively coupleable to each channel of the channel interface, the neural network adapted to synthesize vibration signals corresponding to each of the plurality of machines from the sampled current data;

wherein a processor of the host computer cycles through each of the channels, the processor performing classical vibration analysis on each of the plurality of machines using the synthesized vibration signal for each respective machine.

31. A system of claim 30, further including a memory operatively coupleable to the processor, the memory adapted to store historical vibration analysis data which the processor can access when performing the classical vibration analysis.

32. The system of claim 30, wherein the plurality of machines includes at least one of either: an AC induction machine, a pump, and a generator.

33. A system for training a neural network to synthesize data relating to the operation of a machine, comprising:

a first sensor operatively coupleable to the machine, the first sensor adapted to obtain a first signal relating to the operation of the machine; a second sensor operatively coupleable to the machine, the second sensor adapted to obtain a second signal relating to the operation of a machine, the second signal having data relating to the first signal encoded therein; and a neural network operatively coupleable to the second sensor, the neural network being trainable to generate a synthesized first signal from the second signal, wherein the synthesized first signal is substantially equivalent to the first signal obtained from the first sensor.

* * * * *